US012407013B2

(12) United States Patent
Fan et al.

(10) Patent No.: US 12,407,013 B2
(45) Date of Patent: Sep. 2, 2025

(54) ON-LINE TAPE PASTING MECHANISM FOR FOIL BAND MOVEMENT DIRECTION

(71) Applicant: SHENZHEN KATOP AUTOMATION TECHNOLOGY CO., LTD., Guangdong (CN)

(72) Inventors: ZhenHua Fan, Guangdong (CN); LiGen Xing, Guangdong (CN); CaiHuan Guo, Guangdong (CN)

(73) Assignee: SHENZHEN KATOP AUTOMATION TECHNOLOGY CO., LTD., Guangdong (CN)

(*) Notice: Subject to any disclaimer, the term of this patent is extended or adjusted under 35 U.S.C. 154(b) by 458 days.

(21) Appl. No.: 17/791,355

(22) PCT Filed: Jan. 4, 2021

(86) PCT No.: PCT/CN2021/070116
§ 371 (c)(1),
(2) Date: Jul. 7, 2022

(87) PCT Pub. No.: WO2021/139622
PCT Pub. Date: Jul. 15, 2021

(65) Prior Publication Data
US 2023/0352718 A1    Nov. 2, 2023

(30) Foreign Application Priority Data
Jan. 7, 2020   (CN) .......................... 202010015459.4

(51) Int. Cl.
H01M 10/04     (2006.01)
B65H 35/00     (2006.01)

(52) U.S. Cl.
CPC .... H01M 10/0404 (2013.01); B65H 35/0066 (2013.01)

(58) Field of Classification Search
None
See application file for complete search history.

(56) References Cited

U.S. PATENT DOCUMENTS 6,220,331 B1     4/2001 Matsuda et al.
2018/0162668 A1  6/2018 Hong

FOREIGN PATENT DOCUMENTS

CN     103354281 A     10/2013
CN     203294970 U     11/2013
(Continued)

OTHER PUBLICATIONS

CN 103354281B machine translation (Year: 2015).*
(Continued)

Primary Examiner — Barbara J Musser
(74) Attorney, Agent, or Firm — Michael Best & Friedrich LLP

(57) ABSTRACT

Provided are a scheduling method and apparatus based on a deep learning node computation, and a storage medium. The scheduling method includes: a to-be-computed node of a preset neural network computation graph is acquired; a node type of the to-be-computed node is determined, where the node type includes a hardware computation node and a software computation node; in a case where the node type is the hardware computation node, the hardware computation node is scheduled to a first queue, and whether a hardware computing power module corresponding to the hardware computation node is occupied or not is determined; and in a case where the hardware computing power module is not occupied, the hardware computation node is input into the hardware computing power module for computing.

9 Claims, 6 Drawing Sheets

(56) References Cited

FOREIGN PATENT DOCUMENTS

| | | | |
|---|---|---|---|
| CN | 106099163 | A | 11/2016 |
| CN | 207861532 | U | 9/2018 |
| CN | 111063928 | A | 4/2020 |
| CN | 211957805 | U | 11/2020 |
| JP | H04148765 | A | 5/1992 |
| JP | H11301916 | A | 11/1999 |
| JP | 2013052325 | A | 3/2013 |
| JP | 2015023703 | A | 2/2015 |
| KR | 100514969 | B1 | 9/2005 |
| KR | 10-2019-0059620 | A | 5/2019 |

OTHER PUBLICATIONS

PCT/CN2021/070116 International Search Report dated Apr. 8, 2021.
Translation of Japanese Office Action for Application No. 2022-54227, dated Jul. 28, 2023 (3 pages).
Korean Patent Office Action for Application No. 1020227026038 dated Mar. 4, 2025 (16 pages including English machine translation).
Chinese Patent Office Action for Application No. 202010015459.4 dated Nov. 27, 2024 (20 pages including English machine translation).

* cited by examiner

ON-LINE TAPE PASTING MECHANISM FOR FOIL BAND MOVEMENT DIRECTION

CROSS-REFERENCE TO RELATED APPLICATIONS

This is a National Stage Application filed under 35 U.S.C. 371 based on International Patent Application No. PCT/CN2021/070116, filed on Jan. 4, 2021, which claims priority to Chinese Patent Application No. 202010015459.4 filed with the China National Intellectual Property Administration (CNIPA) on Jan. 7, 2020, the contents of which are incorporated herein by reference in their entireties.

TECHNICAL FIELD

The present disclosure relates to the field of lithium battery processing and, in particular, to an on-line tape pasting mechanism for a foil band movement direction.

BACKGROUND

With the wide application of lithium batteries, a growing number of devices related to the production of lithium batteries come into being. To satisfy the requirements of society, the degree of automation of battery production enterprises is getting higher and higher, and various devices are becoming unmanned and intelligent.

In the production process of lithium batteries, two adjacent rolls of foil need to be spliced to achieve continuous winding. In the related art, after the foil is automatically spliced, the strength of the splicing position is lower than that of other positions, so that the phenomenon of band breakage at the splicing position is prone to occur in the subsequent process, and thus the machining quality of the batteries is affected, a lot of labor and material resources are required for maintenance, and the production cost is high. Moreover, individual positions that need to be spliced are spliced by manual operation, and at this time, the processing equipment needs to shut down, thereby seriously reducing the production efficiency and further increasing the production cost.

To sum up, the related art has technical defects such as insufficient strength of the splicing position, the affected production quality of the batteries, low production efficiency, and high production cost, which seriously limit the further development and popularization of the field.

In view of this, an object of the present disclosure is to provide a new technical scheme to solve the existing technical defects.

SUMMARY

To overcome deficiencies in the related art, the present disclosure provides an on-line tape pasting mechanism for a foil band movement direction, which solves the following technical defects of the related art: insufficient strength of a foil splicing position, the affected machining quality, low manual splicing efficiency, reduced production efficiency and high production cost.

To solve technical issues, the present disclosure adopts technical schemes described below.

An on-line tape pasting mechanism for a foil band movement direction includes a rack and the following assemblies directly or indirectly mounted on the rack: an unwinding assembly, a tape pulling assembly, a tape pasting assembly, a tape preparation assembly, a tape preparation drive assembly and a tape transfer assembly. The unwinding assembly is configured to unwind a tape roll. The tape pulling assembly is configured to pull out the tape roll. The tape pasting assembly is configured to paste a tape to the tape preparation assembly and cut the tape. The tape preparation assembly is configured to prepare a required tape. The tape preparation drive assembly is configured to control a length of the tape prepared on the tape preparation assembly. The tape transfer assembly is configured to transfer the tape prepared on the tape preparation assembly onto a foil to be pasted with a tape.

As an improvement of the preceding technical scheme, the tape transfer assembly includes a swing arm hinged to a side mounting plate of the rack and a swing drive cylinder mounted on a sidewall of the swing arm, an output end of the swing drive cylinder is movably connected to the side mounting plate of the rack and capable of driving the swing arm to swing around a hinge axis of the swing arm, a transfer assembly rotating shaft is provided at an end of a free end of the swing arm, a transfer tape preparation roller is provided on the transfer assembly rotating shaft, and the swing arm is capable of driving the transfer assembly rotating shaft and the transfer tape preparation roller to achieve transfer movement during a swinging process.

As a further improvement of the preceding technical scheme, a clutch device is provided on the swing arm and includes a clutch cylinder disposed on an inner sidewall of the swing arm and a clutch motor disposed at an output end of the clutch cylinder, a clutch drive wheel is mounted on an output shaft of the clutch motor, the clutch cylinder is capable of driving the clutch drive wheel to be in frictional contact with the transfer assembly rotating shaft, the clutch motor is capable of driving the clutch drive wheel to rotate and further driving the transfer assembly rotating shaft in frictional contact with the clutch drive wheel to rotate, and the clutch device is capable of controlling different rotational speeds of the transfer assembly rotating shaft and the transfer tape preparation roller to adapt to tape pasting speeds and movement speeds of the foil in different operating conditions.

As a further improvement of the preceding technical scheme, the tape transfer assembly is further provided with an angle control device, the angle control device is configured to control a rotational angle of the transfer assembly rotating shaft and a rotational angle of the transfer tape preparation roller during tape pasting and tape transferring, the angle control device includes a tape preparation angle sensor and a tape transfer sensor that are mounted on the swing arm and a sensing piece that is disposed on the transfer assembly rotating shaft and mates with the tape preparation angle sensor and the tape transfer sensor for use, the sensing piece is mounted on the transfer assembly rotating shaft through a sensing piece mount, and the transfer assembly rotating shaft is mounted on the free end of the swing arm through a rotating shaft bearing.

As a further improvement of the preceding technical scheme, the angle control device has an acceleration control method for an advance angle, the advance angle includes a static position advance angle and a dynamic start advance angle, the static position advance angle is used for ensuring that a tape pasting starting position of ahead of a tape is accurate, and the dynamic start advance angle is used for the transfer tape preparation roller to rapidly accelerate to approach a speed of the foil.

As a further improvement of the preceding technical scheme, the swing drive cylinder is a secondary stroke cylinder, the swing arm is a secondary swing stroke swing arm, two swing arms are provided, the transfer assembly rotating shaft is mounted between free ends of the two swing arms, a number of transfer tape preparation rollers matches a number of tape preparation assemblies, the transfer tape preparation rollers are vacuum rollers, and the transfer assembly rotating shaft is provided with a vacuum and vacuum breaking pipeline joint that mates with the transfer tape preparation rollers for use.

As a further improvement of the preceding technical scheme, the tape preparation assembly includes a tape preparation plate, a taped head translation module, and a taped head translation drive cylinder, an output end of the taped head translation module is provided with a taped head cylinder, an output end of the taped head translation drive cylinder is connected to the taped head cylinder and capable of driving the taped head cylinder to move horizontally on the taped head translation module, and an output end of the taped head cylinder is provided with a tape preparation taped head.

As a further improvement of the preceding technical scheme, the tape preparation drive assembly includes a tape preparation drive motor, a tape preparation drive screw nut pair and a tape preparation guide rail that are mounted on the rack, a tape preparation sliding plate is disposed on the tape preparation guide rail, an output end of the tape preparation drive motor is connected to an end of a lead screw of the tape preparation drive screw nut pair, a nut of the tape preparation drive screw nut pair is fixedly connected to the tape preparation sliding plate through a nut connecting block, the tape preparation drive motor is capable of driving the tape preparation sliding plate to slide on the tape preparation guide rail through the tape preparation drive screw nut pair, and the tape preparation assembly is mounted on the tape preparation sliding plate.

As a further improvement of the preceding technical scheme, the unwinding assembly includes an unwinding rotating shaft and an unwinding turntable, the tape pulling assembly includes a tape pulling cylinder, a tape pulling guide roller, and a tape pulling guide post; and the tape pasting assembly includes a tape pasting cylinder, a tape pasting guide roller, a tape pasting block, a tape cutting cylinder, and a tape cutter.

As a further improvement of the preceding technical scheme, a plurality of groups of unwinding assemblies, tape pulling assemblies, tape pasting assemblies and tape preparation assemblies are provided.

As a further improvement of the preceding technical scheme, the on-line tape pasting mechanism for a foil band movement direction further includes a front idler roller, a rear idler roller and a tape pasting back roller that are used for guiding the foil.

The present disclosure has the following beneficial effects: the present disclosure provides an on-line tape pasting mechanism for a foil band movement direction; the on-line tape pasting mechanism for a foil band movement direction includes an unwinding assembly, a tape pulling assembly, a tape pasting assembly, a tape preparation assembly, a tape preparation drive assembly and a tape transfer assembly; the unwinding assembly, the tape pulling assembly and the tape pasting assembly may transfer the tape onto the tape preparation assembly; the tape transfer assembly may accurately paste the tape prepared on the tape preparation assembly to the splicing position on the foil; the foil does not need to be stopped, and high-speed tape pasting can be achieved so that the production efficiency can be greatly improved; the strength of the splicing position after foil splicing is higher, and the splicing position cannot be broken easily, which is conducive to improving the machining quality.

To sum up, the on-line tape pasting mechanism for a foil band movement direction solves the following technical defects of the related art: insufficient strength of a foil splicing position, the affected machining quality, low manual splicing efficiency, reduced production efficiency and high production cost.

BRIEF DESCRIPTION OF DRAWINGS

The present disclosure is further described below in conjunction with drawings and embodiments.

Figure 1:
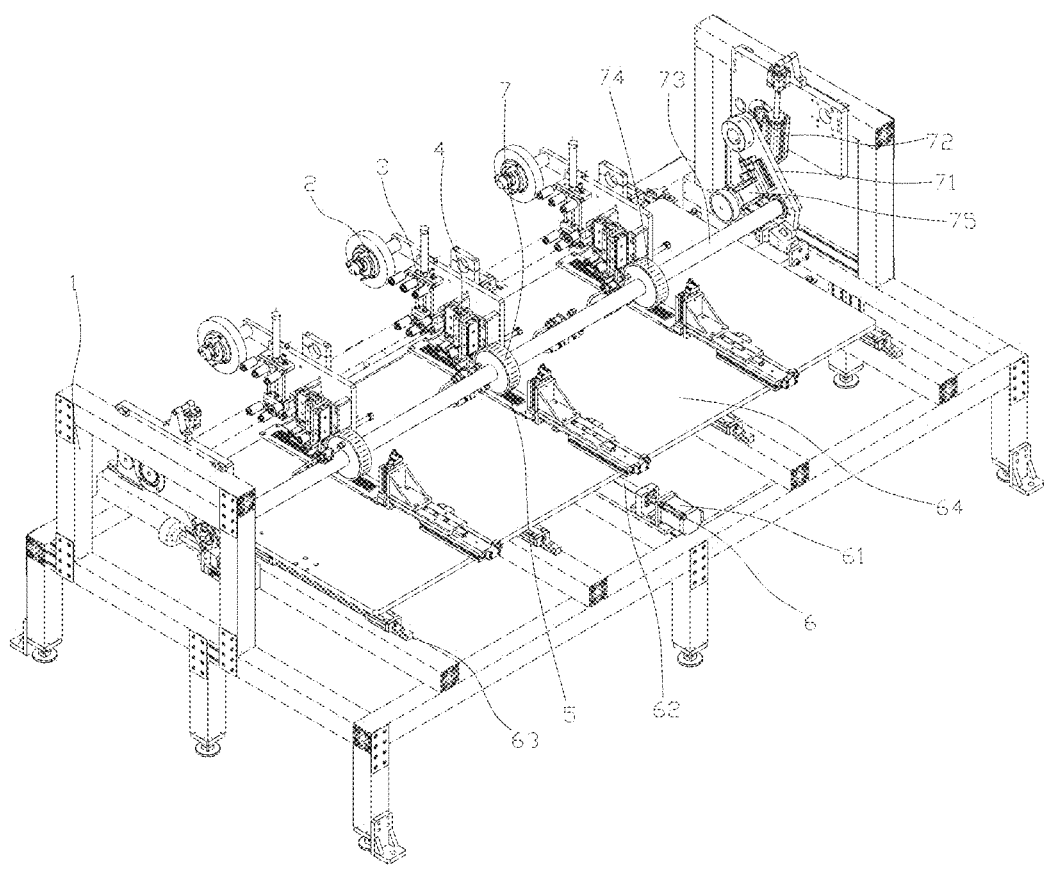
FIG. 1 is an axonometric view of a multi-module configuration according to an embodiment of the present disclosure.
Figure 2:
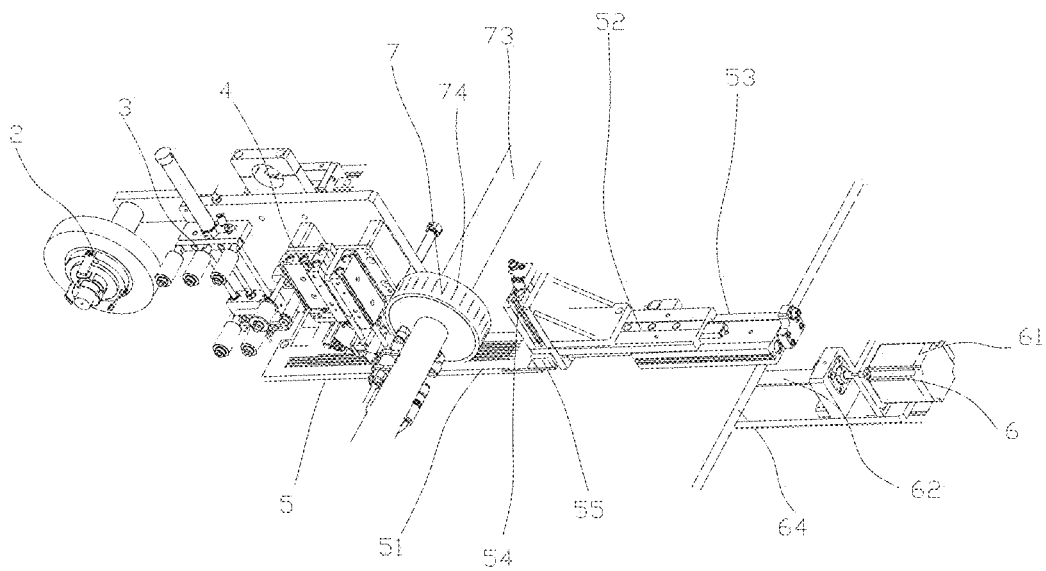
FIG. 2 is an enlarged axonometric view of a single module according to an embodiment of the present disclosure.
Figure 3:
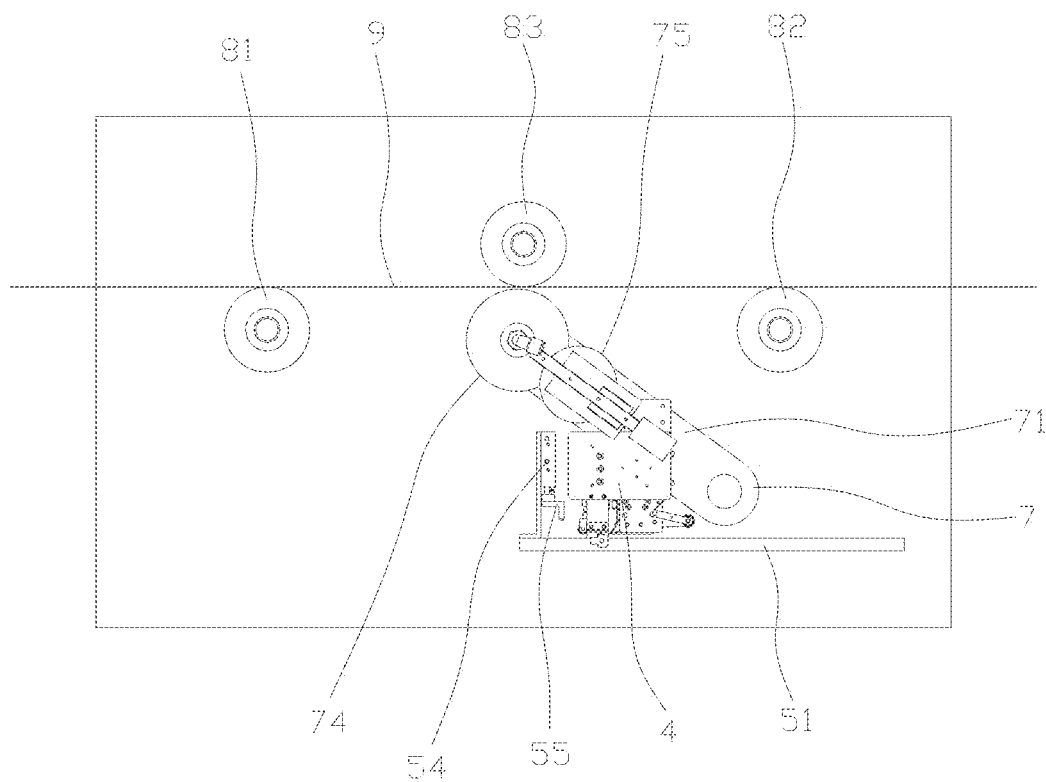
FIG. 3 is a side view of an initial state of a tape pasting mechanism according to an embodiment of the present disclosure.
Figure 4:
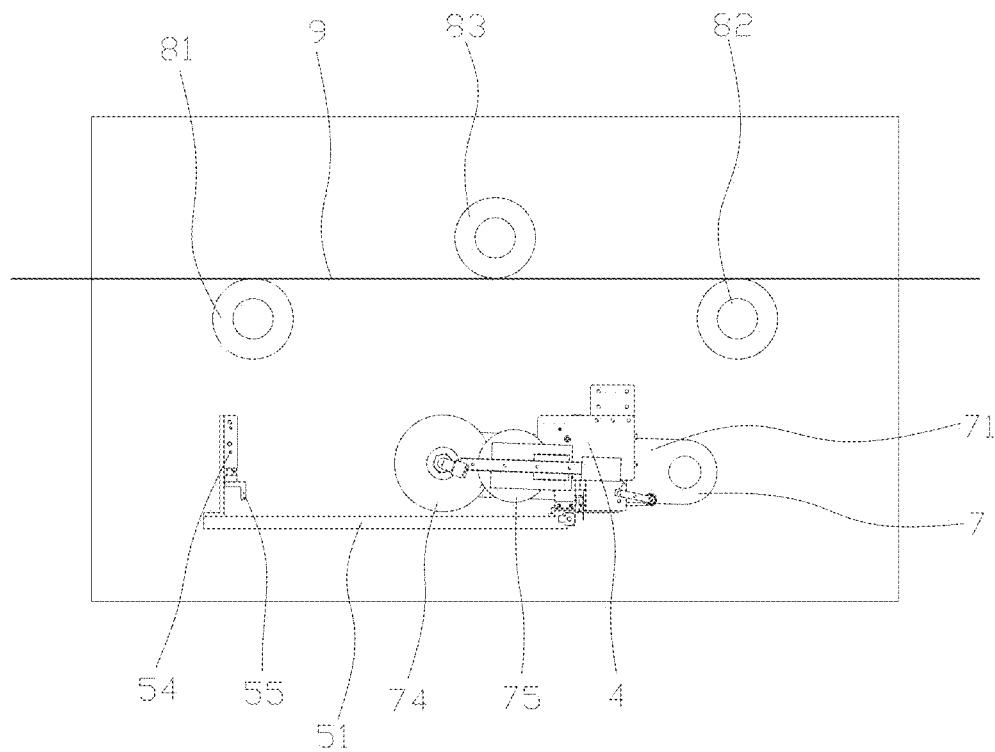
FIG. 4 is a side view of a first transfer of a tape according to an embodiment of the present disclosure.
Figure 5:
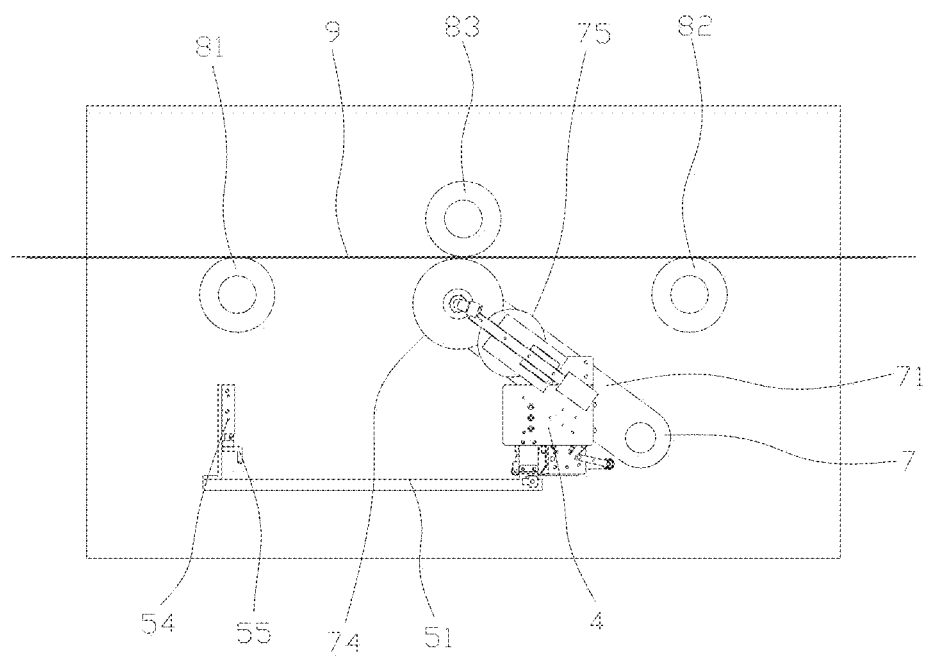
FIG. 5 is a side view of a second transfer of a tape according to an embodiment of the present disclosure.

REFERENCE LIST 1 rack
2 unwinding assembly
3 tape pulling assembly
4 tape pasting assembly
5 tape preparation assembly
51 tape preparation plate
52 taped head translation module
53 taped head translation drive cylinder
54 taped head cylinder
55 taped head
6 tape preparation drive assembly
61 tape preparation drive motor
62 tape preparation drive screw nut pair
63 tape preparation guide rail
64 tape preparation sliding plate
7 tape transfer assembly
71 swing arm
72 swing drive cylinder
73 transfer assembly rotating shaft
74 transfer tape preparation roller
75 clutch device
751 clutch cylinder
752 clutch motor
753 clutch drive wheel
761 tape preparation angle sensor
762 tape transfer sensor
763 sensing piece
764 sensing piece mount
77 vacuum and vacuum breaking pipeline joint
81 front idler roller
82 rear idler roller
83 tape pasting back roller
9 foil

DETAILED DESCRIPTION

A concept, a specific structure and technical effects of the present disclosure are clearly and completely described below in conjunction with the embodiments and drawings, to fully understand the object, feature and effects of the present disclosure. Apparently, the embodiments described herein are part, not all, of the embodiments of the present disclosure. Based on the embodiments of the present disclosure, other embodiments obtained by those skilled in the art on the premise that no creative work is done are within the scope of the present disclosure. In addition, all coupling/connection relationships involved in the present disclosure do not mean that components are directly connected, but refer to according to specific implementations, coupling accessories are added or reduced to compose a better coupling structure. Referring to FIGS. 1 to 8, various technical features in the present disclosure can be combined interactively on the premise of not contradicting each other.

In an embodiment, referring to FIGS. 1 to 5, an on-line tape pasting mechanism for a foil band movement direction includes a rack 1 and an unwinding assembly 2, a tape pulling assembly 3, a tape pasting assembly 4, a tape preparation assembly 5, a tape preparation drive assembly 6 and a tape transfer assembly 7 that are directly or indirectly mounted on the rack 1. The unwinding assembly 2 is configured to unwind a tape roll, the tape pulling assembly 3 is configured to pull out the tape roll, the tape pasting assembly 4 is configured to paste a tape to the tape preparation assembly 5 and cut the tape, the tape preparation assembly 5 is configured to prepare a required tape, the tape preparation drive assembly 6 is configured to control a length of the tape prepared on the tape preparation assembly 5, and the tape transfer assembly 7 is configured to transfer the tape prepared on the tape preparation assembly 5 onto foil 9 to be pasted with a tape.

In an embodiment, the tape transfer assembly 7 includes a swing arm 71 hinged to a side mounting plate of the rack 1 and a swing drive cylinder 72 mounted on a sidewall of the swing arm 71, an output end of the swing drive cylinder 72 is movably connected to the side mounting plate of the rack 1 and capable of driving the swing arm 71 to swing around a hinge axis of the swing arm 71, a transfer assembly rotating shaft 73 is provided at an end of a free end of the swing arm 71, a transfer tape preparation roller 74 is provided on the transfer assembly rotating shaft 73, and the swing arm 71 is capable of driving the transfer assembly rotating shaft 73 and the transfer tape preparation roller 74 to achieve transfer movement during a swinging process.

In an embodiment, a clutch device 75 is provided on the swing arm 71 and includes a clutch cylinder 751 disposed on an inner sidewall of the swing arm 71 and a clutch motor 752 disposed at an output end of the clutch cylinder 751, a clutch drive wheel 753 is mounted on an output shaft of the clutch motor 752, the clutch cylinder 751 is capable of driving the clutch drive wheel 753 to be in frictional contact with the transfer assembly rotating shaft 73, and the clutch motor 752 is capable of driving the clutch drive wheel 753 to rotate and further driving the transfer assembly rotating shaft 73 in frictional contact with the clutch drive wheel 753 to rotate.

The clutch device 75 can achieve the switching between active rotation, passive rotation, high-speed rotation and low-speed rotation of the transfer assembly rotating shaft 73 and the transfer tape preparation roller 74 in a tape transfer mechanism in different operating conditions, to adapt to speeds in difference operating conditions such as tape pasting and high-speed movement of the foil.

The tape transfer assembly 7 is further provided with an angle control device. The angle control device is configured to control a rotational angle of the transfer assembly rotating shaft 73 and a rotational angle of the transfer tape preparation roller 74 during tape pasting and tape transferring and includes a tape preparation angle sensor 761 and a tape transfer sensor 762 that are mounted on the swing arm 71 and a sensing piece 763 that is disposed on the transfer assembly rotating shaft 73 and mates with the tape preparation angle sensor 761 and the tape transfer sensor 762 for use. The sensing piece 763 is mounted on the transfer assembly rotating shaft 73 through a sensing piece mount 764. The transfer assembly rotating shaft 73 is mounted on the free end of the swing arm 71 through a rotating shaft bearing.

The angle control device may precisely control the rotational angle of the transfer tape preparation roller 74 during tape transferring.

In an embodiment, the swing drive cylinder 72 is a secondary stroke cylinder, the swing arm 71 is a secondary swing stroke swing arm, two swing arms 71 are provided, the transfer assembly rotating shaft 73 is mounted between free ends of the two swing arms 71, the number of transfer tape preparation rollers 74 matches the number of tape preparation assemblies 5, the transfer tape preparation rollers 74 are vacuum rollers, and the transfer assembly rotating shaft 73 is provided with a vacuum and vacuum breaking pipeline joint 77 that mates with the transfer tape preparation rollers 74 for use.

In an embodiment, the tape preparation assembly 5 includes a tape preparation plate 51, a taped head translation module 52, and a taped head translation drive cylinder 53, a taped head cylinder 54 is provided at an output end of the taped head translation module 52, an output end of the taped head translation drive cylinder 53 is connected to the taped head cylinder 54 and capable of driving the taped head cylinder 54 to move horizontally on the taped head translation module 52, and a tape preparation taped head 55 is provided at an output end of the taped head cylinder 54.

The tape preparation plate 51 is made of a specific material, and the surface of the tape preparation plate 51 is treated to control the adhesiveness and detachability of the tape.

The adhesiveness between the transfer tape preparation roller 74 and the back of the tape is greater than the adhesiveness between an adhesive surface of the tape and the tape preparation plate 51, to achieve the transfer of the single-sided tape from the tape preparation plate 51 to the transfer tape preparation roller 74.

In an embodiment, the tape preparation drive assembly 6 includes a tape preparation drive motor 61, a tape preparation drive screw nut pair 62 and a tape preparation guide rail 63 that are mounted on the rack 1, a tape preparation sliding plate 64 is disposed on the tape preparation guide rail 63, an output end of the tape preparation drive motor 61 is connected to an end of a lead screw of the tape preparation drive screw nut pair 62, a nut of the tape preparation drive screw nut pair 62 is fixedly connected to the tape preparation sliding plate 64 through a nut connecting block, the tape preparation drive motor 61 is capable of driving the tape preparation sliding plate 64 to slide on the tape preparation guide rail 63 through the tape preparation drive screw nut pair 62, and the tape preparation assembly 5 is mounted on the tape preparation sliding plate 64.

In an embodiment, the unwinding assembly 2 includes an unwinding rotating shaft and an unwinding turntable, the tape pulling assembly 3 includes a tape pulling cylinder, a tape pulling guide roller, and a tape pulling guide post, and the tape pasting assembly 4 includes a tape pasting cylinder, a tape pasting guide roller, a tape pasting block, a tape cutting cylinder, and a tape cutter.

In an embodiment, multiple groups of unwinding assemblies 2, tape pulling assemblies 3, tape pasting assemblies 4 and tape preparation assemblies 5 are provided, and each group of the unwinding assembly 2, the tape pulling assembly 3, the tape pasting assembly 4 and the tape preparation assembly 5 is provided with one transfer tape preparation roller 74 correspondingly.

In an embodiment, a front idler roller 81, a rear idler roller 82 and a tape pasting back roller 83 that are used for guiding the foil 9 are further included.

Figure 6:
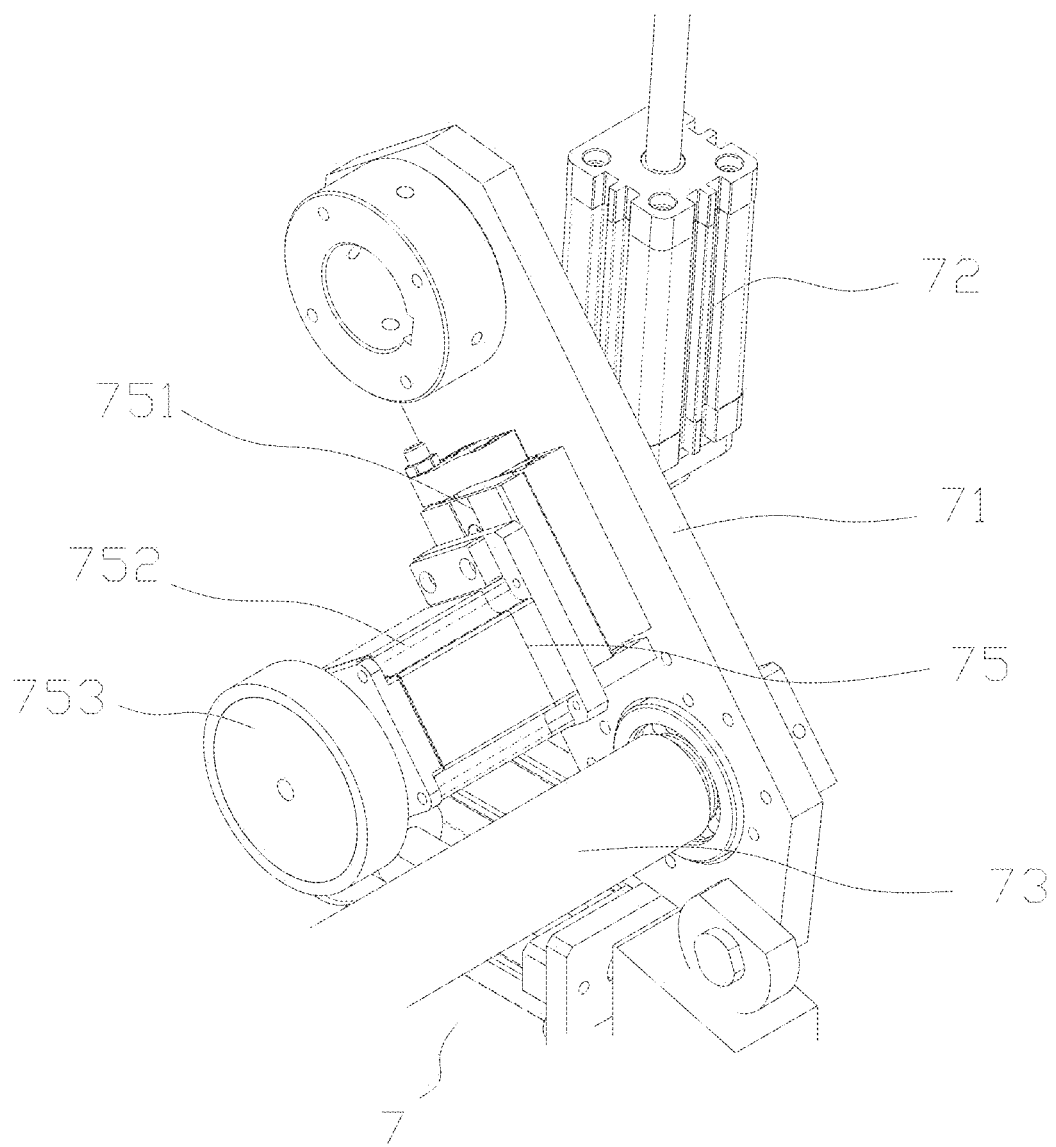
FIG. 6 is a schematic view of a clutch device according to an embodiment of the present disclosure.
Figure 7:
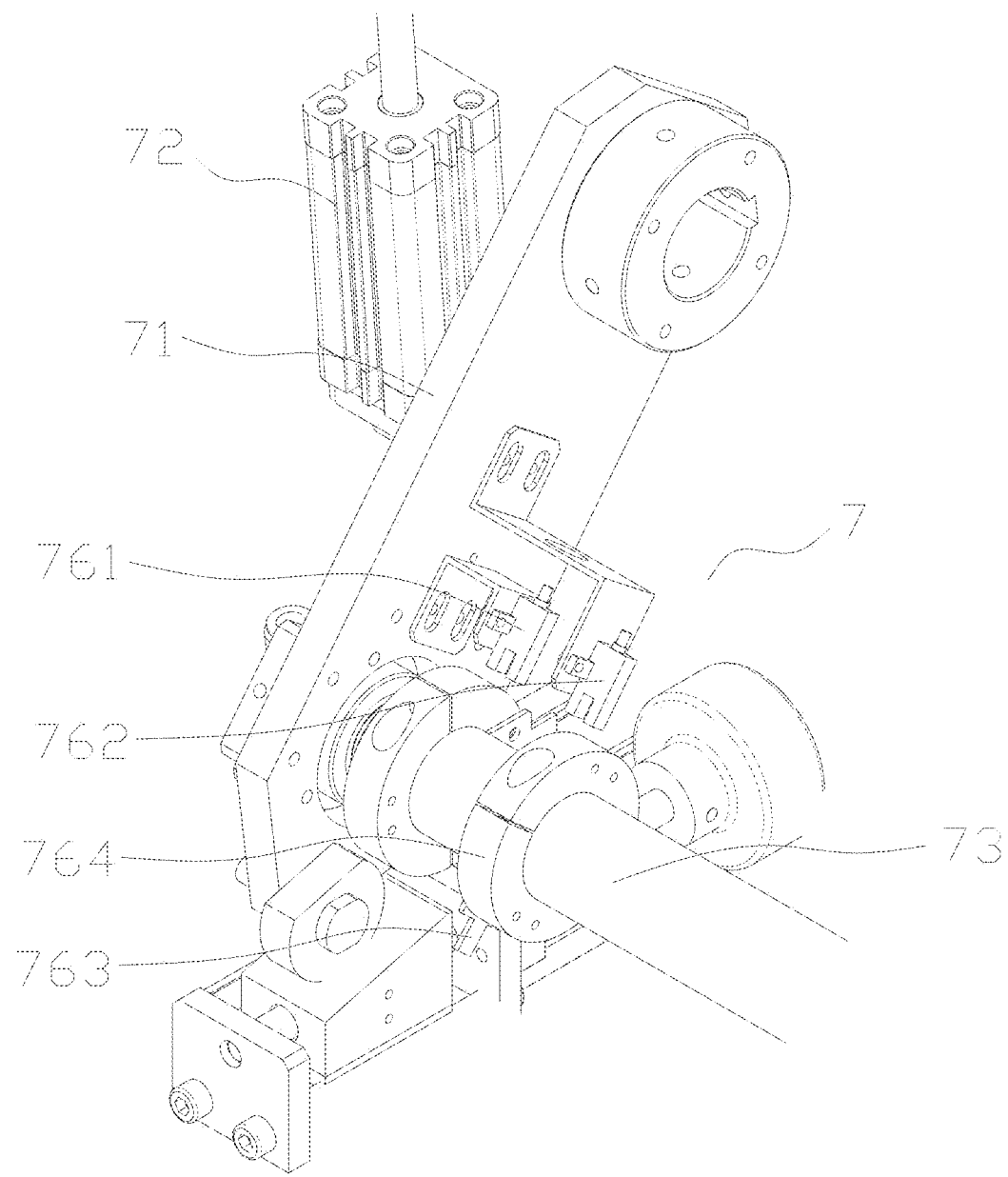
FIG. 7 is a schematic view of an angle control device according to an embodiment of the present disclosure.
Figure 8:
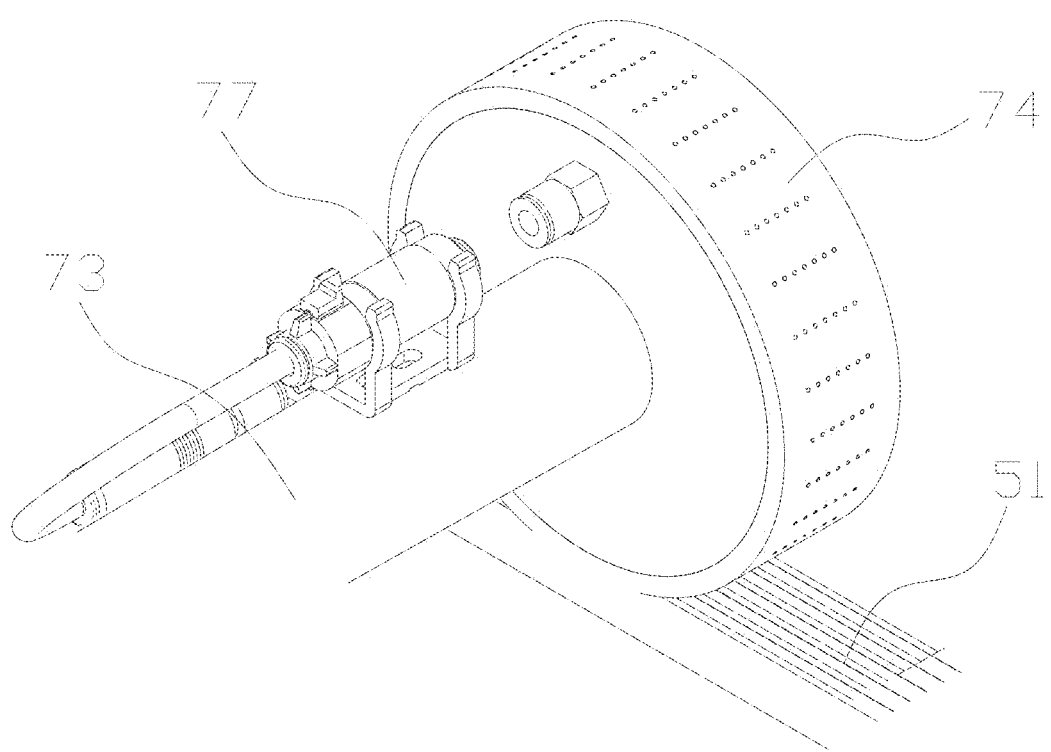
FIG. 8 is a structural view of a first transfer of a tape according to an embodiment of the present disclosure.

In the actual implementation of the present disclosure, referring to FIGS. 6 to 8, the single-sided tape mounted on the unwinding assembly 2 is pasted to the tape preparation plate 51 on the tape preparation assembly 5 after the action of the tape pulling assembly 3 and the tape pasting assembly 4. The tape preparation plate 51 is a plate formed by a special material through a certain surface treatment. The functional characteristic of the tape preparation plate 51 is that the single-sided tape may be pasted on the surface of the tape preparation plate 51 and may also be easily separated from the tape preparation plate 51 when the back of the single-sided tape is in contact with the transfer tape preparation roller 74.

Further, the tape preparation drive assembly 6 drives the tape preparation assembly 5 to move, to achieve the control of the length of the prepared tape and the avoidance for positions of other mechanisms.

After a tape preparation action of the tape preparation assembly 5 is completed, the swing drive cylinder 72 in the tape transfer assembly 7 drives the swing arm 71 to swing so that the transfer tape preparation roller 74 on the transfer assembly rotating shaft 73 moves and abuts against the tape preparation plate 51. At the same time, the tape preparation drive motor 61 in the tape preparation drive assembly 6 drives the tape preparation plate 51 in the tape preparation assembly 5 to move back through the tape preparation drive screw nut pair 62, and finally the single-sided tape on the tape preparation plate 51 is transferred to the transfer tape preparation roller 74 in the tape transfer assembly 7.

In this way, the tape is transferred from the tape preparation plate 51 to the transfer tape preparation roller 74 to achieve a first transfer of the tape. After the first transfer of the tape is completed, the swing drive cylinder 72 drives the swing arm 71 to swing upward and further drives the transfer tape preparation roller 74 to be lifted upward. The transfer tape preparation roller 74 is lifted upward to a certain position and then stops at a middle position, waiting for a second transfer tape pasting signal.

In addition, the foil 9 is moved along a path of the front idler roller 81, the rear idler roller 82, and the tape pasting back roller 83, thereby ensuring that the surface of the foil 9 is flat and does not shake.

When the incoming foil 9 needs to be pasted with a tape, the swing drive cylinder 72 in the tape transfer assembly 7 drives the swing arm 71 to swing continuously, and the swing arm 71 continues to lift the transfer assembly rotating shaft 73 and the transfer tape preparation roller 74 so that it is ensured that the transfer tape preparation roller 74 is pressed against the bottom of the tape pasting back roller 83, and the single-sided tape on the transfer tape preparation roller 74 is transferred to the foil 9, thereby achieving the second transfer of the tape.

In the preceding process, the rotational angle of the transfer tape preparation roller 74 is precisely controlled by the angle control device, and a specific control process is as follows: when the tape is transferred from the tape preparation plate 51 to the transfer tape preparation roller 74 for the first transfer, the rotational angle of the transfer tape preparation roller 74 is determined by the tape preparation angle sensor 761; and when the tape is transferred from the transfer tape preparation roller 74 to the foil 9 for the second transfer, the angle of the transfer tape preparation roller 74 is determined by the tape transfer sensor 762.

A specific angle exists between the tape preparation angle sensor 761 and the tape transfer sensor 762 and is referred to as an advance angle. The advance angle includes a static position advance angle and a dynamic start advance angle. The static position advance angle ensures that a tape pasting starting position of a head of a tape is accurate; and the dynamic start advance angle is used for the transfer tape preparation roller 74 to rapidly accelerate to a rotational linear speed close to a speed of the foil so that it is ensured that the tape is smoothly peeled off during two transfers and the head and tail of the tape are accurately pasted to the corresponding positions on the foil 9.

In the preceding process, the rotational speed of the transfer tape preparation roller 74 is precisely controlled by the clutch device 75, and a specific control process is as follows: when the tape is transferred from the tape preparation plate 51 to the transfer tape preparation roller 74 for the first transfer, the tape is transferred at a low speed, the rotational linear speed of the transfer tape preparation roller 74 matches a movement speed of the tape preparation plate 51, and the movement speed of the tape preparation plate 51 is controlled by the tape preparation drive assembly 6. In an embodiment, the movement speeds of the tape preparation sliding plate 64 and the tape preparation plate 51 are controlled by the tape preparation drive motor 61 and the tape preparation drive screw nut pair 62.

When the transfer tape preparation roller 74 transfers the tape onto the foil 9 for the second transfer, the foil 9 is moved online in the movement direction of the foil band at a high speed. At this time, the clutch cylinder 751 in the clutch device 75 drives the clutch drive wheel 753 to be in frictional contact with the transfer assembly rotating shaft 73. Further, the clutch motor 752 drives the clutch drive wheel 753 to rotate, and the clutch drive wheel 753 drives the transfer assembly 73 and the transfer tape preparation roller 74 to rotate through the frictional action between the clutch drive wheel 753 and the transfer assembly rotating shaft 73 until the rotational linear speed of the transfer tape preparation roller 74 approaches an actual movement speed of the foil 9. At this time, the clutch cylinder 751 rapidly drives the clutch drive wheel 753 to back off and be separated from the transfer assembly rotating shaft 73. At this time, the transfer tape preparation roller 74 slides passively and makes the linear speed of the transfer tape preparation roller 74 match the actual movement speed of the foil 9. In this manner, the band breakage of the foil 9 can be avoided caused by a slight speed difference between the linear speed of the transfer tape preparation roller 74 and the foil 9, and thus the safety is better.

The vacuum and vacuum breaking pipeline joint 77 provided on the transfer assembly rotating shaft 73 is used for mating with the transfer tape preparation roller 74 for use. The vacuum and vacuum breaking pipeline joint 77 vacuumizes the transfer tape preparation roller 74 during the first transfer of the tape, which is convenient for the success of the first transfer of the tape. The vacuum and vacuum breaking pipeline joint 77 breaks the vacuum of the transfer tape preparation roller 74 during the second transfer of the tape so that the tape is successfully transferred to the foil 9 for the second transfer. The reliability of the first transfer and the second transfer of the tape can be greatly improved through the vacuum and vacuum breaking pipeline joint 77.

What is claimed is:

1. An on-line tape pasting mechanism for a foil band movement direction, comprising: a rack and following assemblies directly or indirectly mounted on the rack: an unwinding assembly, a tape pulling assembly, a tape pasting assembly, a tape preparation assembly, a tape preparation drive assembly and a tape transfer assembly;

wherein the unwinding assembly is configured to unwind a tape roll, the tape pulling assembly is configured to pull out the tape roll, the tape pasting assembly is configured to paste a tape to the tape preparation assembly and cut the tape to obtain a required tape, the tape preparation assembly is configured to prepare the required tape, the tape preparation drive assembly is configured to control a length of the required tape prepared on the tape preparation assembly, and the tape transfer assembly is configured to transfer the required tape prepared on the tape preparation assembly onto a foil to be pasted with the required tape;

wherein the tape transfer assembly comprises a swing arm hinged to a side mounting plate of the rack and a swing drive cylinder mounted on a sidewall of the swing arm, wherein an output end of the swing drive cylinder is movably connected to the side mounting plate of the rack and capable of driving the swing arm to swing around a hinge axis of the swing arm, a transfer assembly rotating shaft is provided at an end of a free end of the swing arm, a transfer tape preparation roller is provided on the transfer assembly rotating shaft, and the swing arm is capable of driving the transfer assembly rotating shaft and the transfer tape preparation roller to achieve transfer movement during a swinging process.

2. The on-line tape pasting mechanism for a foil band movement direction of claim 1, wherein a clutch device is provided on the swing arm and comprises a clutch cylinder disposed on an inner sidewall of the swing arm and a clutch motor disposed at an output end of the clutch cylinder, a clutch drive wheel is mounted on an output shaft of the clutch motor, the clutch cylinder is capable of driving the clutch drive wheel to be in frictional contact with the transfer assembly rotating shaft, the clutch motor is capable of driving the clutch drive wheel to rotate and further driving the transfer assembly rotating shaft in frictional contact with the clutch drive wheel to rotate, and the clutch device is capable of controlling different rotational speeds of the transfer assembly rotating shaft and the transfer tape preparation roller to adapt to tape pasting speeds and movement speeds of the foil in different operating conditions.

3. The on-line tape pasting mechanism for a foil band movement direction of claim 1, wherein the tape transfer assembly is further provided with an angle control device, wherein the angle control device is configured to control a rotational angle of the transfer assembly rotating shaft and a rotational angle of the transfer tape preparation roller during tape pasting and tape transferring, and the angle control device comprises a tape preparation angle sensor and a tape transfer sensor that are mounted on the swing arm and a sensing piece that is disposed on the transfer assembly rotating shaft and mates with the tape preparation angle sensor and the tape transfer sensor for use, wherein the sensing piece is mounted on the transfer assembly rotating shaft through a sensing piece mount, and the transfer assembly rotating shaft is mounted on the free end of the swing arm through a rotating shaft bearing.

4. The on-line tape pasting mechanism for a foil band movement direction of claim 3, wherein the angle control device has an acceleration control method for an advance angle, wherein the advance angle comprises a static position advance angle and a dynamic start advance angle, wherein the static position advance angle is used for ensuring that a tape pasting starting position of a head of the tape is accurate, and the dynamic start advance angle is used for the transfer tape preparation roller to rapidly accelerate to approach a speed of the foil.

5. The on-line tape pasting mechanism for a foil band movement direction of claim 1, wherein the swing drive cylinder is a secondary stroke cylinder, the swing arm is a secondary swing stroke swing arm, two swing arms are provided, the transfer assembly rotating shaft is mounted between free ends of the two swing arms, a number of transfer tape preparation rollers matches a number of tape preparation assemblies, the transfer tape preparation rollers are vacuum rollers, and the transfer assembly rotating shaft is provided with a vacuum and vacuum breaking pipeline joint that mates with the transfer tape preparation rollers for use.

6. The on-line tape pasting mechanism for a foil band movement direction of claim 1, wherein the tape preparation assembly comprises a tape preparation plate, a taped head translation module, and a taped head translation drive cylinder, wherein an output end of the taped head translation module is provided with a taped head cylinder, an output end of the taped head translation drive cylinder is connected to the taped head cylinder and capable of driving the taped head cylinder to move horizontally on the taped head translation module, and an output end of the taped head cylinder is provided with a tape preparation taped head.

7. The on-line tape pasting mechanism for a foil band movement direction of claim 1, wherein the tape preparation drive assembly comprises a tape preparation drive motor, a tape preparation drive screw nut pair and a tape preparation guide rail that are mounted on the rack, wherein a tape preparation sliding plate is disposed on the tape preparation guide rail, an output end of the tape preparation drive motor is connected to an end of a lead screw of the tape preparation drive screw nut pair, a nut of the tape preparation drive screw nut pair is fixedly connected to the tape preparation sliding plate through a nut connecting block, the tape preparation drive motor is capable of driving the tape preparation sliding plate to slide on the tape preparation guide rail through the tape preparation drive screw nut pair, and the tape preparation assembly is mounted on the tape preparation sliding plate.

8. The on-line tape pasting mechanism for a foil band movement direction of claim 1, wherein the unwinding assembly comprises an unwinding rotating shaft and an unwinding turntable; the tape pulling assembly comprises a tape pulling cylinder, a tape pulling guide roller, and a tape pulling guide post; and the tape pasting assembly comprises a tape pasting cylinder, a tape pasting guide roller, a tape pasting block, a tape cutting cylinder, and a tape cutter.

9. The on-line tape pasting mechanism for a foil band movement direction of claim 1, wherein a plurality of groups of unwinding assemblies, tape pulling assemblies, tape pasting assemblies and tape preparation assemblies are provided; and the on-line tape pasting mechanism for a foil band movement direction further comprises a front idler roller, a rear idler roller and a tape pasting back roller that are used for guiding the foil.

\* \* \* \* \*